United States Patent [19]
Morizumi

[11] Patent Number: 4,459,004
[45] Date of Patent: Jul. 10, 1984

[54] AUTOMATIC FOCUSING CAMERA

[75] Inventor: Masaaki Morizumi, Tokyo, Japan

[73] Assignee: Asahi Kogaku Kogyo Kabushiki Kaisha, Tokyo, Japan

[21] Appl. No.: 454,714

[22] Filed: Dec. 30, 1982

[30] Foreign Application Priority Data

Jan. 12, 1982 [JP] Japan .................................... 57-3135

[51] Int. Cl.$^3$ ............................................ G03B 13/18
[52] U.S. Cl. ................................................. 354/403
[58] Field of Search .................... 354/25 R, 25 A, 403

[56] References Cited

U.S. PATENT DOCUMENTS 3,435,744 4/1969 Stimson ........................... 354/25 A
3,442,193 5/1969 Pagel ................................ 354/25 A Primary Examiner—Russell E. Adams
Attorney, Agent, or Firm—Merchant, Gould, Smith, Edell, Welter & Schmidt

[57] ABSTRACT

In an automatic focusing camera comprising a light emitting element and a object distance detecting system, the improvement comprises rotating element which rotates about an optical axis of the camera lens, and optical refracting element for changing directions of the emitted light rays to swing the light rays within a range covering a short object distance and a long object distance, so that the object distance can be represented by an angular displacement of the rotating element.

8 Claims, 8 Drawing Figures

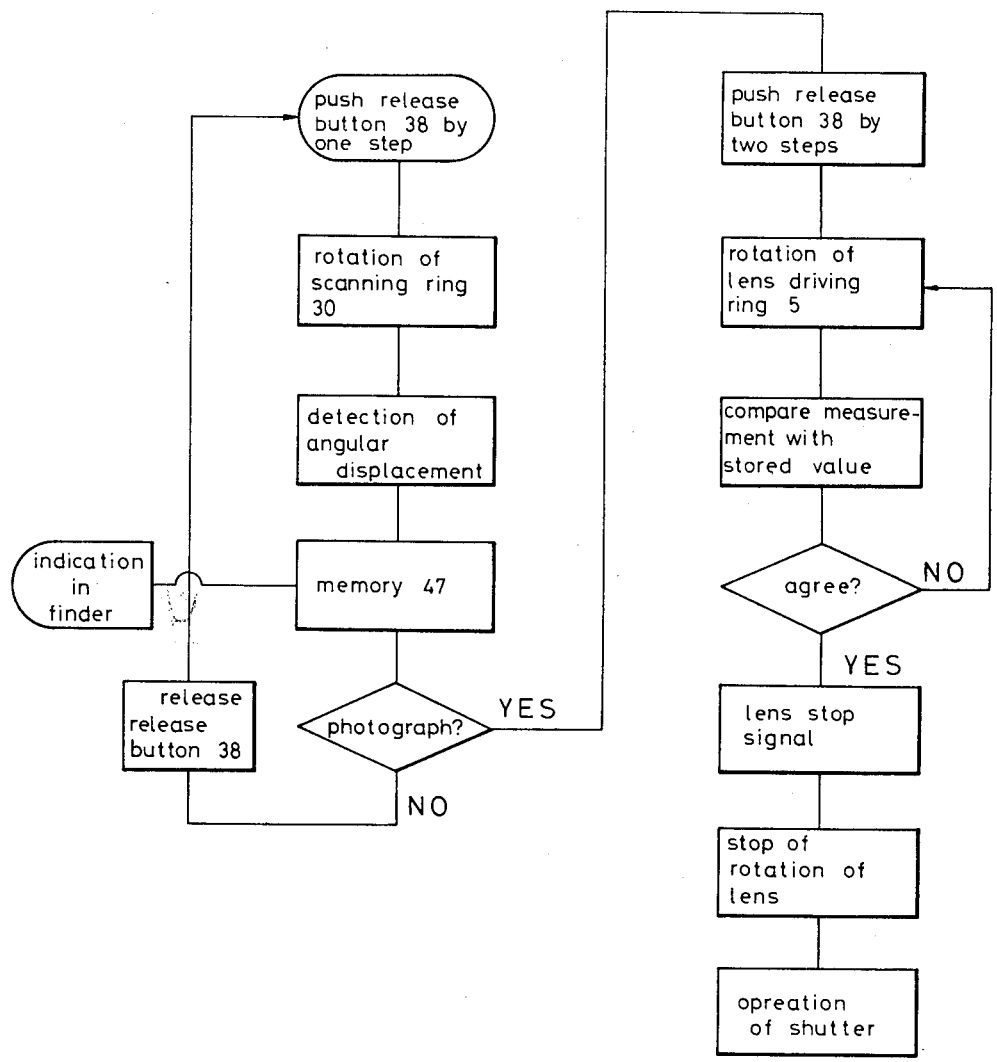

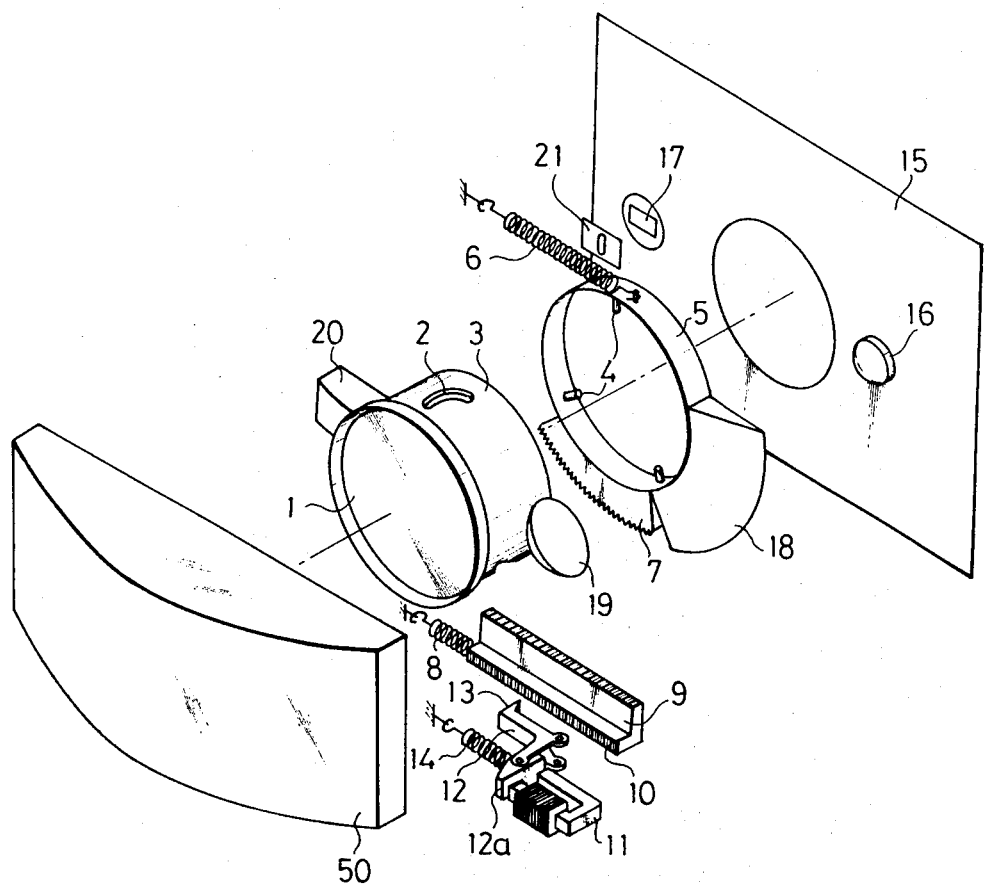

AUTOMATIC FOCUSING CAMERA

This invention relates to an improved automatic focusing camera which emits an object distance measuring light swung or scanned between a short object distance position and a long object distance position to detect an object distance by the light reflected from an object, in order to move a camera lens in accordance with the detected distance. The light rays are reflected from the object only when the scanned light rays are oriented to the object.

In a conventional automatic focusing camera which is known as so-called a "Leica type", a coincidence of two images is electrically detected to measure the object distance, utilizing the principle of optical range finder, so that the camera lens moves in accordance with the measurement. However, the Leica type of camera is large, since it needs two optical systems for producing two optical images and since a distance (base length) between the two optical systems must be increased to increase an accuracy of the measurement of the object distance. Furthermore, usually an intermediate member, such as a cam is provided between an object distance measuring mechanism and a actuating mechanism for moving the camera lens so that the former mechanism is operatively associated with the latter one. However, the provision of such an intermediate member results in complication of the construction of the camera, and in the difficulty of focusing, whereby no satisfying accurate focusing can be effected.

There is also known an automatic focusing camera which emits object distance measuring infrared rays which are scanned or swung between a short object distance position and a long object distance position to detect an object distance by means of the infrared rays reflected from an object, for the purpose of increasing a precision of measurement. However, in this type of known camera, although the precision of measurement can be improved, it has no solution to the above mentioned problems raised by a complex mechanism for operatively connecting the object distance measuring mechanism and the camera lens actuation mechanism, and accordingly automatic focusing cannot be effected with high precision as a whole.

The primary object of the present invention is, therefore, to provide a simple automatic focusing camera which has substantially no or an extremely simple intermediate member for operatively connecting the object distance measuring mechanism and the camera lens driving mechanism and which can ensure a precise detection of an object distance and a precise control of the movement of the camera lens, thus resulting in automatic focusing with high precision.

To achieve the afore-mentioned object of the invention, an automatic focusing camera which emits light rays scanned or swung between a short object distance position and a long object distance position to detect an object distance by the light rays reflected from an object has, according to the present invention, optical refracting means which is provided on a rotational member capable of rotating about an optical axis of the camera lens for changing the emission angle of the light rays in accordance with the rotation of the rotational member to swing the light rays, so that the object distance can be detected as a function of an angular displacement of the rotational member. The rotational member can be an existing lens driving ring, so that object distance detecting and camera lens driving can be achieved at one time by a single same mechanism, i.e., the lens driving ring. Even if an additional rotational member other than the lens driving ring is provided, automatic focusing can be effected only by feeding information of the angular displacement of the rotational member to the lens driving ring.

The invention will be described below in detail with reference to the accompanying drawings, in which.

Figure 1:
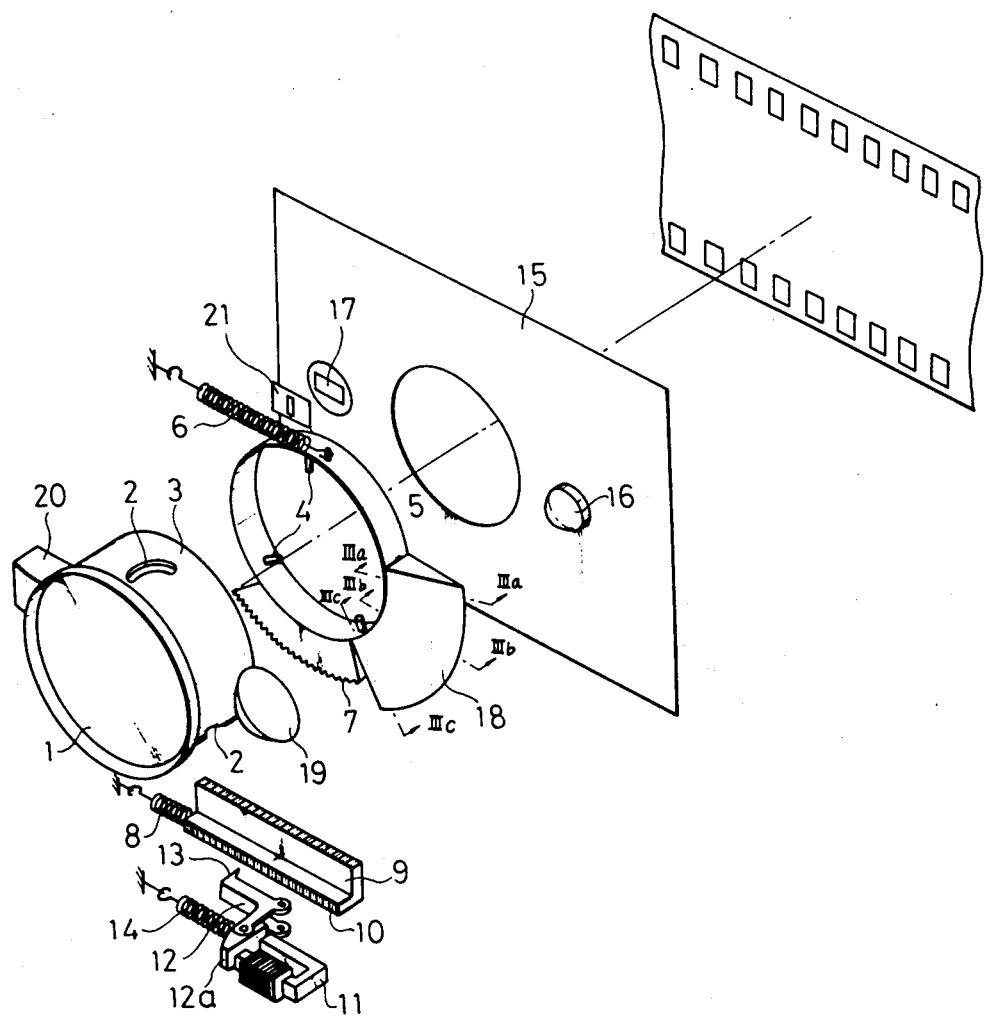
FIG. 1 is an exploded perspective view of main parts of an automatic focusing camera, according to an embodiment of the present invention.
Figures 3A, 3B, 3C:
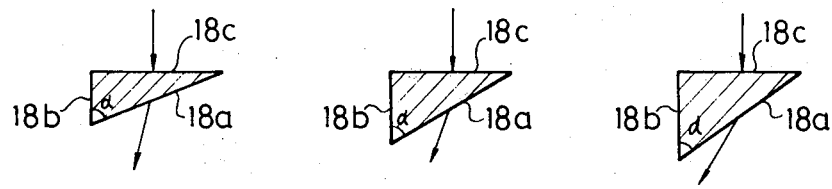
Figure 4:
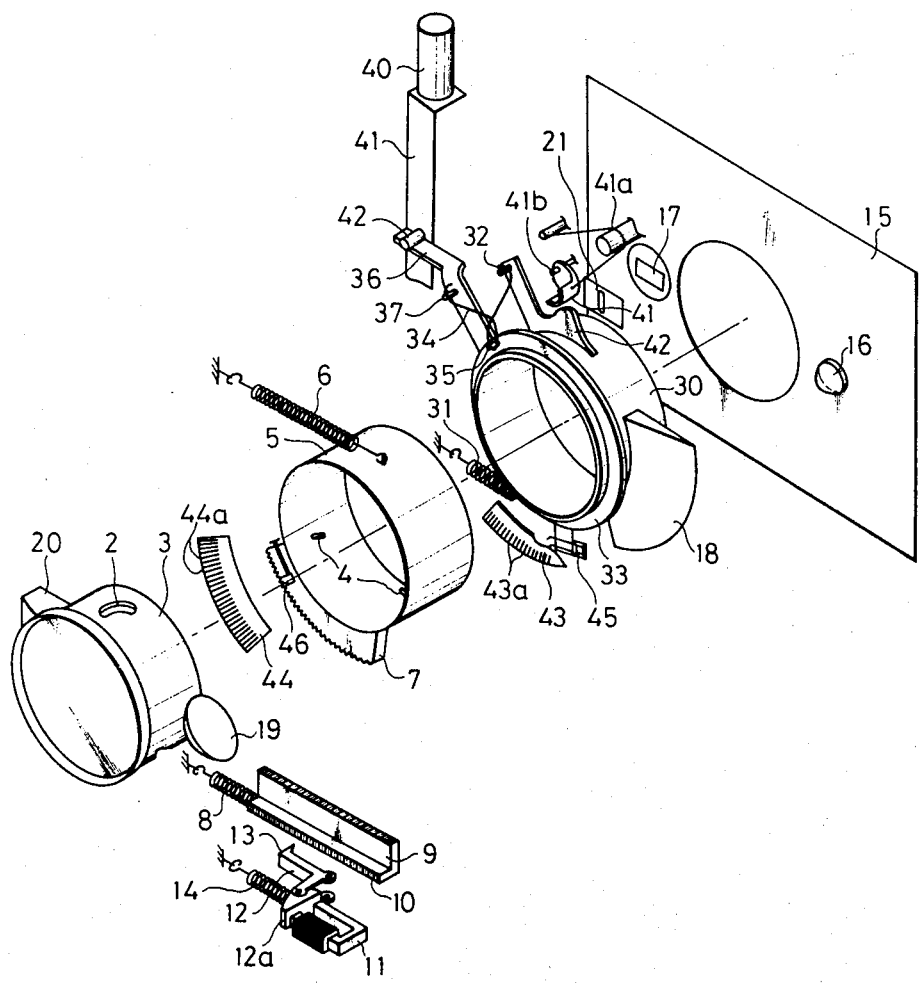

FIGS. 3a, 3b, and 3c are sectional views taken along the lines IIIa—IIIa, IIIb—IIIb and IIIc—IIIc in FIG. 1, respectively:

FIG. 4 is an exploded perspective view of main parts of an automatic focusing camera in which an object distance measuring operation and a lens driving operation are independently effected, according to another embodiment of the invention;

FIG. 5 is a diagram of a flow chart showing the movement of the camera shown in FIG. 4; and, FIG. 6 is an exploded perspective view of main parts of an automatic focusing camera which has a close-up attachment lens.

In FIG. 1 which shows an embodiment of the present invention, a camera lens 1 is secured to a cam ring 3 having cam grooves 2. On the outer periphery of the cam ring 3 is located a lens driving ring 5 which has pins 4 which are engaged in the corresponding cam grooves 2. The lens driving ring 5 rotates against a lens driving spring 6 by means of a drive mechanism (not shown) simultaneously with film advancing and shutter actuating to keep the camera lens 1 at an infinite object distance position (or shortest object distance position). As soon as the driving force applied to the lens driving ring 5 is released immediately before the shutter is released, the lens driving ring 5 is rotated by means of the spring 6 in the opposite direction, so that the camera lens 1 is advanced or retracted by the engagement of the pins 4 in the cam grooves 2.

The ring 5 is provided, on its outer periphery, with a sector gear 7 integral therewith which is engaged by a plate 9 with rack. The plate 9 is continuously biased in one direction by a tension spring 8 and move in its longitudinal directions when the sector gear 7 rotates. The plate 9 has tooth 10 which is engaged by and disengaged from a claw 13 of a stop crank 12 which swings when a lens stop magnet assembly 11 is energized and deenergized. The magnet assembly 11 is composed of a permanent magnet and a magnetic coil. When the magnet is energized, it attracts an armature 12a of the crank 12 by the actuation of the shutter (not shown) to disengage the claw 13 from the tooth 10 of the plate 9. When a shutter release button (not shown) is pushed and the detection of the object distance is completed, the magnet 11 is deenergized in response to a stop signal corresponding to the completion of detection, so that the claw 13 comes into engagement with the tooth 10 of the plate 9 by means of the spring force of a tension spring 14 to stop the movements of the lens driving ring 5 and the camera lens 1.

The above-mentioned construction is a typical one used in a conventional automatic focusing camera, for moving and stopping the camera lens. The discussion will be now directed to an optical object distance measuring system, according to the present invention.

A circuit board 15 which is located in rear of the lens driving ring 5 has a light emitting element 16 for measuring an object distance (e.g. Light Emitting Diode) and a light receiving element 17 which is located on the opposite sides of the camera lens 1. The light emitting element 16 emits a beam of infrared rays having a small illuminating angle.

The light rays are emitted toward an object O (FIG. 2) through a prismatic refracting element 18 provided on the periphery of the lens driving ring 5 according the present invention and through a flood light lens 19.

The light reflected from the object O is collected onto the light receiving element 17 through an imaging or condensor lens 20 and a light receiving element mask 21.

Figure 2:
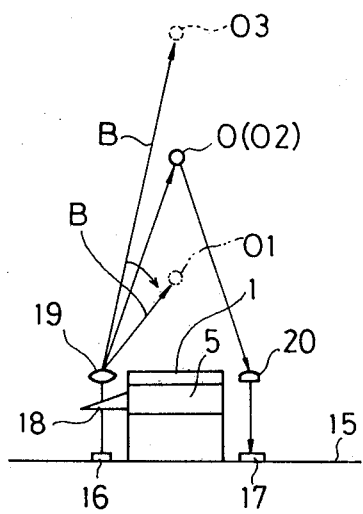
FIG. 2 is a plan view showing the principle of measurement of an object distance.

The prismatic refracting element 18 refracts the beam B of the light rays between a short object distance position and a long object distance position when the lens driving ring 5 rotates, as shown in FIG. 2. For the purpose of refraction, the refracting element 18 has a triangular sectional shape having a refracting surface 18a, a base surface 18b and an incident surface 18c. The refracting surface 18a is inclined with respect to the base surface 18b at an angle α which gradually increases in the direction of the rotational movement of the lens driving ring toward an infinite object distance position thereof, as shown in FIGS. 3a through 3c. For clarification, the change of the angle α is illustrated in an enlarged scale. The refracting element 18 is mounted to the lens driving ring 5 in such a way that reach of the beam of light rays to the object always corresponds to the displacement of the camera lens 1 by the lens driving ring 5.

When the shutter release button 38 (FIG. 4) is pushed to cause the light emitting element 16 to emit the light rays and to energize the magnet assembly 11, the lens driving ring 5 is rotated by the spring 6, so that the light rays refracted by the refracting element 18 is scanned or swung from (or to) the infinite object distance position to (or from) the short object distance position by the rotation of the refracting element 18 together with the lens driving ring 5.

Supposing that the object O is located at a medial object distance position O2 in FIG. 2, the light rays can be reflected by the object only when the beam of the light rays illuminates the object and the reflected light rays are received by the light receiving element 17. Therefore, by detecting a moment at which the light receiving element 17 has an output, the object distance can be detected as a function of an angular displacement of the lens driving ring 5. The magnet assembly 11 is deenergized in response to the output signal of the light receiving element 17, so that the camera lens 1 which is moved by the lens driving ring 5 is stopped at a desired position corresponding to the detected object distance. Thus, automatic focusing is effected. After that, the shutter is actuated.

It can be easily understood that when the object is located at the long distance position O3 or the short distance position O1, the camera lens can be also stopped at a desired position corresponding to the position O3 or O1, in accordance with an output signal of the element 17. Automatic focusing can be thus effected over the whole photographing range.

In the above-mentioned embodiment, the refracting element 18 is provided directly on the lens driving ring 5. Alternatively, it is also possible to provide the refracting element on an additional separate scanning ring 30, as shown in FIG. 4. In this modification, the object distance is represented by the angular displacement of the scanning ring 30. The detection signal of the object distance is stored and then given to the lens driving ring 5. The scanning ring 30 having the refracting element 18 on the periphery is located in rear of the lens driving ring 5 and is rotatable about an optical axis of the camera lens 1. The scanning ring 30 is continuously biased by a counter spring 31 in a clockwise direction in FIG. 4. The scanning ring 30 has a spring connecting pin 32 to which a spring 34 is connected. On the periphery of the scanning ring 30 is rotatably fitted a scan starting ring 33 which has a pin 35 and a scan starting lever 36. The spring 34 which is connected at its one end to the pin 32 is connected to a pin 37 provided on the lever 36. The spring 34 is also connected to the pin 35. The scan starting lever 36 bears against an abutment pin 40 provided on a release plate 39 which is, in turn, integral with a shutter release button 38, so that when the shutter release button 38 is pushed down, the scanning ring 30 rotates in a counterclockwise direction in FIG. 4. On the scanning ring 30 is provided an escapement projection 42 which is engaged by an escapement rotor 41 rotatable about a pin 41b. The escapement rotor 41 is continuously biased by a spring 41a in one direction.

The scanning ring 30 and the lens driving ring 5 have slide contact terminals 45 and 46 which come into slide contact with corresponding fixed comb-like contact plates 43 and 44 provided outside the rings 30 and 5, respectively. The contact plates 43 and 44 have groups of contact terminals 43a and 43b. Each of the slide contact terminals 45 and 46 comes selectively into contact with any one contact terminal 43a (or 43b) of the corresponding contact terminal group to vary electrical outputs, such as electrical resistance in order to detect the angular displacements of the lens driving ring 5 and the scanning ring 30. When the angular displacement of the lens driving ring 5 is identical to that of the scanning ring 30, the electrical output, such as electrical resistance obtained from the side of the lens driving ring 5 is same as that from the side of the scanning ring 30.

Alternatively, it is also possible to provide the comb-like contact plates 43 and 44 on the rings 30 and 5 and to provide the fixed contact terminals 45 and 46 outside the rings 30 and 5.

The camera having the construction as shown in FIG. 5 operates as follows.

In FIG. 8 showing a flow chart of the operation, when the shutter release button 38 is pushed down by one step, the scan starting ring 33 is rotated by the scan starting lever 36 in the counterclockwise direction to charge the spring 34. The scanning ring 30 tends to rotate in the counterclockwise direction when the scan starting ring 33 rotates in the same direction, since one end of the spring 34 is connected to the pin 32 of the scanning ring 30. However, the rotation of the scanning ring 30 is prevented by the spring force of the counter spring 31 and the engagement of the escapement rotor 41 with the escapement projection 42 at the initial stage of the rotation of the scan starting ring 33. The further rotation of the ring 33 causes the escapement rotor 41 to ride over the projection 42 against the spring 41a and the counter spring 31, so that the scanning ring 30 is rotated in the counterclockwise direction by means of the spring 34. Consequently, the refracting element 18 rotates together with the scanning ring 30. When the light receiving element 17 produces an electrical output, the object distance can be detected as a function of the angular displacement of the scanning ring 30.

The aforementioned operations are quite same as those of the first embodiment mentioned above. In the embodiment illustrated in FIGS. 4 and 5, the angular displacement of the scanning ring 30 is represented by an electrical resistance depending on different contact points of the contact terminal 45 with the contact plate 43. The electrical resistance signal is stored in a memory 47.

After that, when the shutter release button 40 is pushed down by two steps, the engagement of the lens driving lens 5 with the shutter mechanism by mean of mechanism per se known is broken, so that the lens driving ring 5 rotates by means of the spring force of the lens driving spring 6. The angular displacement of the lens driving ring 5 is represented by an electrical resistance depending on different contact points of the contact terminal 46 with the contact plate 44. The resistance is then compared with the first mentioned resistance which is stored in the memory 47 and which corresponds to the angular displacement of the scanning ring 30. As soon as the two kinds of resistances are identical to each other, a stop signal is fed to the magnet 11 to deenergize the latter. When the magnet 11 is deenergized, the claw 13 of the stop crank 12 comes into engagement with the tooth 10 of the racked plate 9 to stop the rotational movement of the lens driving ring 5. After that, the shutter is released.

According to the arrangement shown in FIG. 4, the above mentioned object distance detection and memorization can be effected prior to the drive of the camera lens or can be repeatedly effected independently of a photographing operation, and, accordingly, information of the object distance can be indicated in a finder of the camera. Furthermore, the provision of the lens driving ring 5 and the scanning ring 30 separate from the lens driving ring 5 makes the exchange of the camera lens possible.

Although one angular displacement of the scanning ring 30 directly corresponds to one angular displacement of the lens driving ring 5, in the aforementioned embodiments, and although such a correspondence is most practical and advantageous for automatic focusing with high precision, the angular displacement of the scanning ring 30 can be enlarged or reduced in accordance with the amount of the movement of the camera lens so that a reduced or enlarged value of the angular displacement of the scanning ring 30 is fed to the lens driving ring 5. It will be understood that the angular displacements of the scanning ring 30 and the lens driving ring 5 can be represented by an electrical value other than resistance, such as condensor capacity or the number of pulses, or the like.

The contact terminal 45 provided on the scanning ring 30 and the comb-like contact plate 43 with which the contact terminal 45 comes into slide contact can be also used as switching elements for causing the light emitting element 16 to intermittently emit the light. Such an intermittent emission of light from the light emitting element can be, as is well known, adapted to detect the object distance at a limited zone focusing without decreasing the precision of focusing, so that a service life of a battery provided in a camera can be increased. In the arrangement shown in FIG. 4, the intermittent emission of the light emitting element can be easily effected by alternately making the light emitting element ON and OFF by means of any one of the rotating members which rotate about the optical axis during the detection of the object distance. The intermittent emission of the light emitting element can be efficiently effected in such a way that intervals of the intermittent emission become large in a long object distance zone and small in a short object distance zone. This kind of switching elements can be provided on the lens driving ring 5 in the first embodiment shown in FIG. 1.

Further, in the illustrated embodiments, since the light emitting element 16 and the floodlight lens 19 are provided on one side of the camera lens 1 and the condensor lens 20 and the light receiving elements 17 are provided on the opposite side of the camera lens, which viewed in the optical axis direction, if a close-up attachment lens 50 (FIG. 6) is used, the attachment lens 50 can be of small size enough to cover all of the lenses 1, 19 and 20. That is, the object distance measuring light from the lens 19 and the reflected light from the object into the condensor lens 20 are both refracted by the attachment lens 50 when they pass the attachment lens 50. Since rate of refraction of these light rays is same as that of the light passing the attachment lens 50 for making an optical image on a film plane, a small sized attachment lens 50 makes a close-up photographing possible.

The locations of the light receiving optical system are, however, not limited to those illustrated in the drawing figures. That is, although the light emitting element must be located so that the beam of light rays therefrom passes through the refracting element, the light receiving element can be provided on any portion of a camera, so long as it receives the reflected light rays from the object.

Furthermore, the prismatic refracting element 18 can be replaced by optical means for swinging the beam, such as a mirror assembly or the like. It is also possible to provide a prasmatic refracting element having an inclined incident surface 18c which has an inclined angle varying in the peripheral direction of the lens driving ring or the scanning ring in order to swing or scan the beam of the light rays. In this alternative, it is also possible but not always necessary to provide an inclined refracting surface 18a having a varying inclination angle, as shown in FIGS. 3a to 3c.

As can be understood from the above discussion, according to the present invention, the object distance can be detected by an angular displacement of a rotary member which rotates about an optical axis of a camera lens. Therefore, by using a presenting lens driving ring as the rotary member, it is not necessary to provide any intermediate member between the object distance measuring mechanism and the lens driving mechanism, resulting in a provision of an automatic focusing camera which has a simple construction and which can be easily handled and controlled with high precision. Furthermore, the provision of a separate scanning ring for detecting the object distance from the lens driving ring makes it possible to effect the object distance detection independently of the photographing operation. Even if the separate scanning ring is provided, since the lens driving ring can be rotated in accordance with the angular displacement of the scanning ring, no intermediate member is necessary.

I claim:

1. An automatic focusing camera comprising means for emitting object distance detecting light rays, object distance detecting means having an optical system which receives the light rays reflected from an object, for detecting the object distance by the reflected light rays, and lens driving means for moving a camera lens in accordance with the detected object distance, wherein the improvement comprises rotating means including a lens driving ring which rotates about an optical axis of the camera lens in response to a pushing operation of the shutter release button to move the camera lens, optical refracting means on said lens driving ring for changing directions of the emitted light rays to scan the light rays within a range covering a short object distance and a long object distance, so that the object distance can be represented by an angular displacement of the rotating means and the camera lens can be displaced to a required position corresponding to the object distance detected by the refracting means which causes the light rays to be scanned.

2. A camera according to claim 1, wherein said refracting means comprises a prismatic refracting element having a triangular sectional shape and having an inclined incident surface and/or an inclined refracting surface with an angle varying in the peripheral direction of the rotating means.

3. An automatic focusing camera comprising means for emitting object distance detecting light rays, object distance detecting means having an optical system which receives the light rays reflected from an object, for detecting the object distance by the reflected light rays, and lens driving means for moving a camera lens in accordance with the detected object distance, wherein the improvement comprises a scanning ring which rotates about an optical axis of the camera lens and which has optical refracting means for changing direction of the emitted light rays to scan the light rays within a range covering a short object distance and a long object distance, so that the object distance can be represented by an angular displacement of the rotating means, means for storing the detected object distance, a lens driving ring which rotates about the optical axis of the camera lens to move the camera lens, and means for rotating the lens driving ring through an angular displacement corresponding to the stored object distance.

4. A camera according to claim 3, wherein the lens driving ring rotates by an angular displacement equal to that of the scanning ring for detecting the object distance.

5. A camera according to claim 3, further comprising electrical means which feeds electrical outputs varying in accordance with the rotational movements of the scanning ring and the lens driving ring, to the scanning ring and the lens driving ring to detect and control the angular displacements of the ring.

6. A camera according to claim 3, further comprising two-stepped actuation type of shutter release button which causes the scanning ring to rotate when the button is pushed by one step and which causes the lens driving means to move when the button is pushed by two steps.

7. A camera according to claim 4, further comprising electrical means which feeds electrical outputs varying in accordance with the rotational movements of the scanning ring and the lens driving ring, to the scanning ring and the lens driving ring to detect and control the angular displacements of the ring.

8. A camera according to claim 4, further comprising two-stepped actuation type of shutter release button which causes the scanning ring to rotate when the button is pushed by one step and which causes the lens driving means to move when the button is pushed by two steps.

* * * * *